Figure 1:
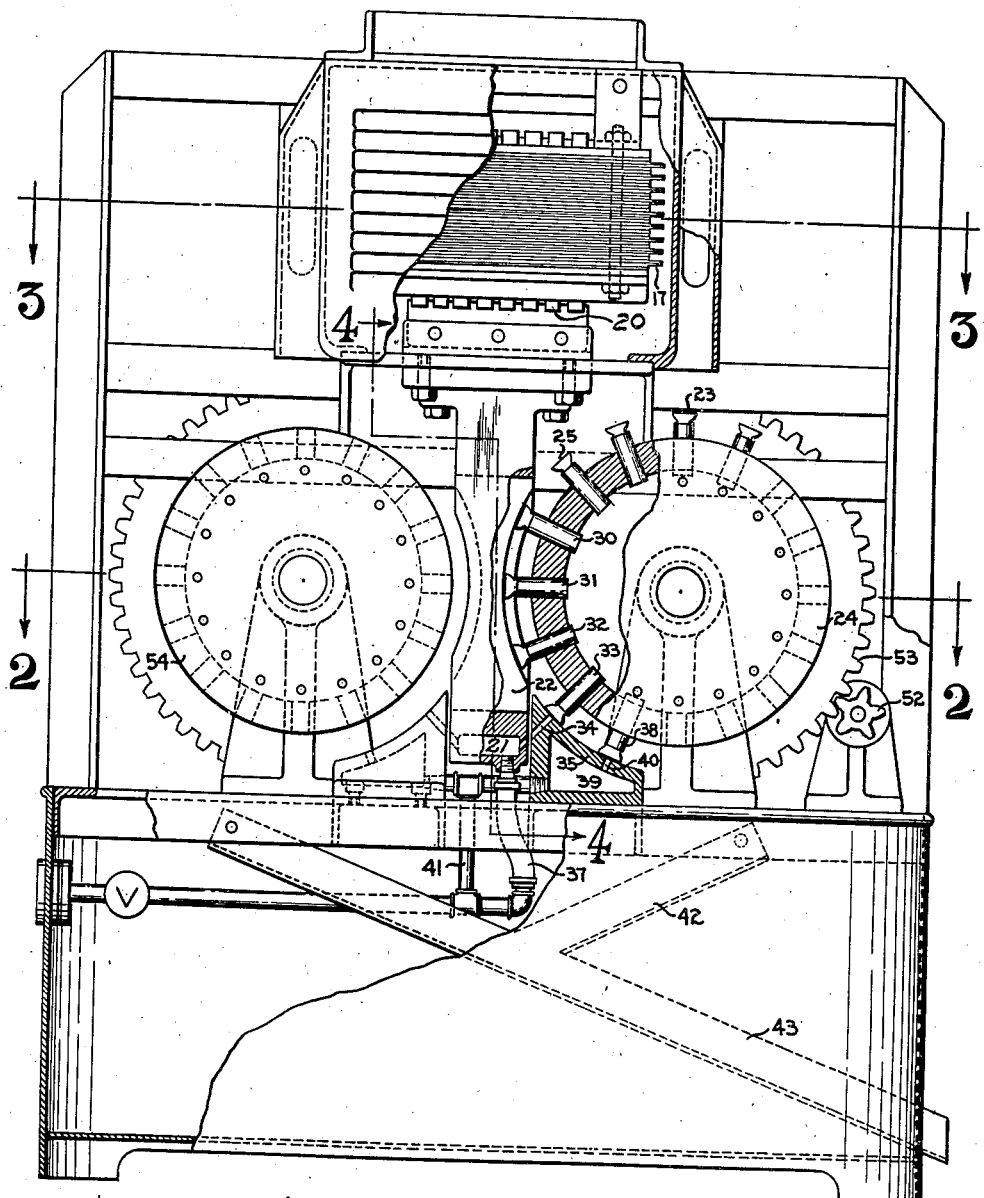

Jan. 14, 1947.  F. S. DENNEEN ET AL  2,414,362
CONTINUOUS HEAT TREATING
Filed Aug. 2, 1940  3 Sheets-Sheet 2

INVENTORS
Francis S. Denneen
William C. Dunn

Patented Jan. 14, 1947

2,414,362

UNITED STATES PATENT OFFICE 2,414,362

CONTINUOUS HEAT-TREATING

Francis S. Denneen, Cleveland, and William C. Dunn, Shaker Heights, Ohio, assignors to The Ohio Crankshaft Company, Cleveland, Ohio, a corporation of Ohio Application August 2, 1940, Serial No. 349,411

17 Claims. (Cl. 219—13)

1

The present invention relates as indicated to apparatus and method for heat-treating quantities of articles, usually relatively small articles, which can be handled manually or which can be delivered from a hopper by a simple automatic feeding mechanism. It is directed mainly to apparatus in which heating is accomplished by current induced locally in the part or parts of the articles it is desired to treat. The article selected for the purpose of present illustration is a tappet for use in an automotive engine.

Heretofore, in heat treating such small articles in large volumes great difficulty was experienced due to the number of times it was necessary to handle the article, and in surface hardening, much expense was involved in preventing the hardness from extending into parts it is desired to maintain in an unhardened condition. This was particularly true when it was necessary to carburize the parts to obtain hardenable surface zones. The carburizing very often left parts of the article in a brittle and weakened condition making it necessary to construct an otherwise simple article out of two or more parts, one of which would be carburized and the other left soft or of such low carbon content that it would not harden by heating and quenching. Such parts were fused or otherwise joined together after machining and carburizing, and then reheated and quenched. In other cases it was necessary to make such articles of castings and chilling the part which it was desired to provide with a hard surface. The chilling not only produced brittleness, but often interferred with subsequent machining operations.

The chief object of this invention is to provide means and method for rapidly providing mass production articles with hardened surface zones in selected areas. A further object is to provide means for fusing one part of an article to another part and substantially simultaneously hardening one or more surface zones of one of the parts without detracting from the physical properties of the other of these parts. Another object is to provide apparatus adaptable to be readily changed over for heat treating a variety of articles. A still further object is to provide a general method for such heat treatment.

With these and other objects in view, this invention then consists of the method herein explained and of apparatus for accomplishing this method. The annexed drawings and following description set forth in detail one form of the apparatus embodying the invention, which

2 apparatus may be constructed in many ways within the scope of the appended claims.

Figure 2:
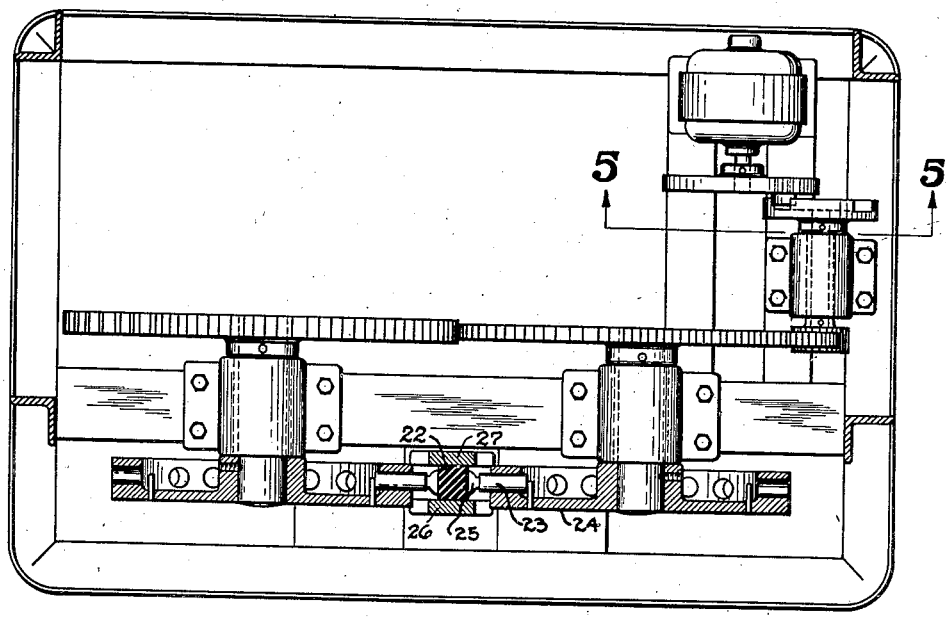
Figure 5:
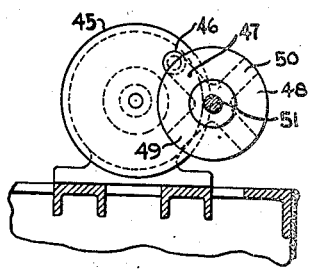
Figure 6:
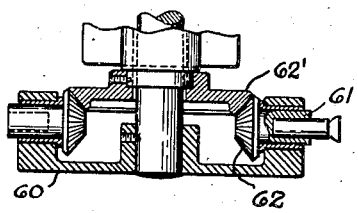
Figure 7:
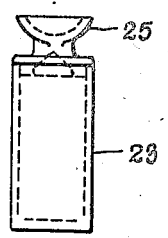
Figure 3:
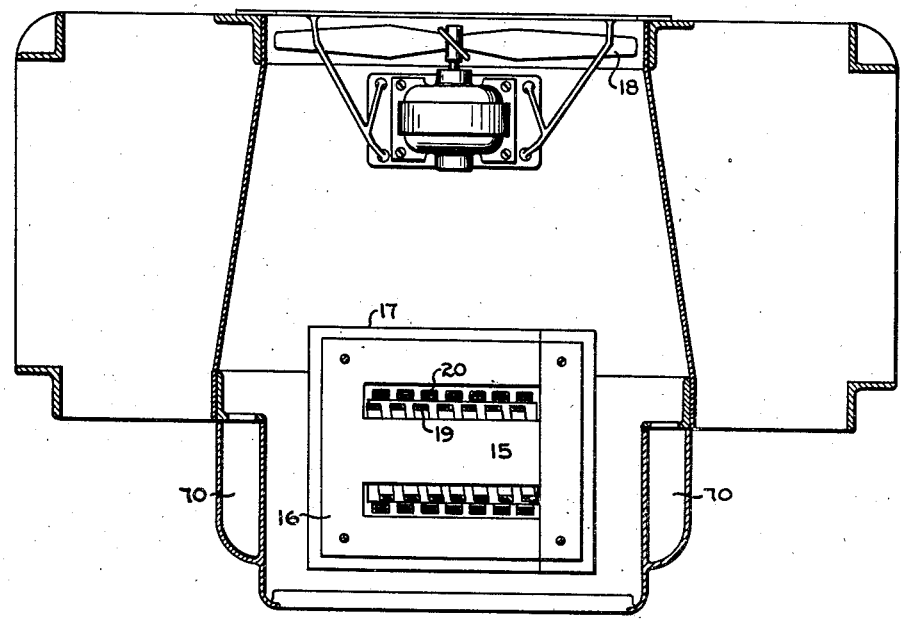
Figure 4:
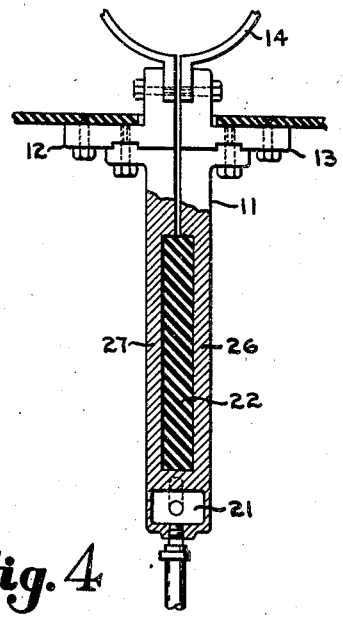

In the said drawings Fig. 1 is an elevation partly in section showing the essential elements of the apparatus in its preferred form. Fig. 2 is a section substantially on line 2—2 of Fig. 1. Fig. 3 is a section on line 3—3 of Fig. 1 showing the ventilating system employed. Fig. 4 is a section substantially on line 4—4 of Fig. 1. Fig. 5 is a fragmentary section at 5—5 of Fig. 2. Figure 6 is a fragmentary section showing a modification of the conveyor mechanism taken substantially on line 2—2 of Figure 1. Fig. 7 illustrates a typical part suitable to be heat treated in our apparatus.

Referring now to the above figures, the inductor 11, in the form of a loop, is connected across the secondary terminals 12 and 13 of the air cooled transformer 14 to whose primary, current of any desired frequency and power rate is supplied. This transformer has a laminated core 15 with an exterior laminated yoke 16 to complete the magnetic circuit. A part of the laminations are made of larger exterior form than the other laminations so as to extend beyond these other laminations as at 17 and thus form fins which are cooled by contact with currents of air circulated by fan 18 which fins thus cooled dissipate heat and thus prevent an excessive rise in temperature of the transformer core as a whole. Water or other cooling fluid circulates through the hollow primary coils 19 and hollow secondary coils 20.

The conductor 11, which is in the form of a loop open at one end, is hollow in part and is cooled by liquid flowing through jacket space 21. The terminals of the loop at its open end are connected across the secondary coils 20. An insulator 22, usually made of marble, is placed between the two branches of the loop. This insulator serves a dual purpose in that it not only insulates the branches from each other but guides or holds in place the articles being heat treated which are represented by the tappets 23 and which are carried past the inductor by the rotating conveyor 24. This conveyor, which is in the form of a wheel, is provided with recesses or sockets into which the tappets are inserted, either manually or automatically by mechanism feeding them to the upper part of the conveyor from a hopper. As this conveyor wheel turns, the ends 25 of these tappets, which it is desired to harden, pass downwardly between the two vertically extending members 26 and 27 of the inductor and thus pass through a highly concentrated flux field whose high frequency alternations induce heating current of such density in these ends 25 that they are rapidly raised to hardening temperature. As these tappet ends enter this field they engage the marble guide 22 which prevents them from being displaced by the electro-magnetic forces to which they are subjected in this field.

Depending on the form of the article being heat treated, upon its material and upon the contour of the surface zone to be affected by the heat treatment, the article is advanced at different rates and by various movements to accomplish the desired results. For instance, in the present case it is desired to harden the extreme end face only of the tappet without materially hardening and adding to brittleness in adjacent parts. To this end, the conveyor wheel 24 is advanced intermittently by steps of a few degrees at a time. Heat is added at each one of the three locations 30, 31 and 32. It is then quickly moved to position 33 where quenching fluid, usually water, is projected through passage 34 directly against the face to be hardened. The movement from station 32 to 33 is accomplished in such a short space of time that very little cooling fluid is lost or sprayed against lateral parts of the tappet due to passage 34 remaining uncovered during the movement of the tappet from station 32 to station 33, although the flow through passage 34 is continuous during the movement. Guide 35, through which passage 34 is drilled, serves as a final guide to hold the tappets in the conveyor during quenching and is of such form that the tappets engage its guiding surface to confine the quenching to the surface only which it is desired to harden and prevent it from reaching lateral or adjacent parts of the tappet and thus cool such adjacent parts fast enough to harden them. Quenching fluid is supplied from jacket space 21 in the inductor to which it is delivered by piping 37. The quenching of the tappet end is completed at station 33 by fluid delivered from jacket 39 through passage 40, this fluid being supplied by piping 41. When the conveyor turns far enough to bring the tappet past the end of the guide 35, the tappet drops out of its recess in the conveyor and onto the chutes 42 and 43 which deliver it by gravity to a receptacle outside of the base of the machine.

To accomplish the intermittent movement by which the tappets are advanced by the conveyor, the mechanism illustrated in Fig. 5 is employed. In this, a disc or wheel 45 having a pin or roller 46 is rotated by a substantially constant speed motor usually through suitable reduction gearing to provide the desired speed of the disc. At each revolution of this disc the pin enters a radial slot or groove such as 47 cut in a driven wheel 48 and in continuing to rotate in a clock-wise direction rotates this wheel 48—90° in a counter-clockwise direction to bring groove 47 to the position shown as being occupied by groove 49 where the pin or roller passes radially out of the groove. Wheel 48 then remains at rest until the pin or roller engages the next slot 50 in the wheel. Wheel 48 thus advances 90° for each revolution of disc 45. By regulating the speed of the motor, the ratio of the reduction gearing and the radial distance of the pin or roller 46 from the shaft of the disc, the periods of rest between movements are regulated and the rapidity of the intermittent movement of wheel 48 is controlled. Wheel 48 is connected by its shaft 51 and suitable gearing such as pinion 52 and gear 53 to the conveyor wheel 24. The conveyor is thus advanced intermittently in the desired manner.

Since the flux field produced by inductor 11 extends on both sides of this inductor, a second conveyor such as 54 is geared to move past the opposite side of this inductor in the opposite direction, and usually, but not necessarily at the same rate to harden more parts of the same or similar characters as are being carried by conveyor 24. The addition of the second conveyor substantially doubles the capacity of the machine with very little difference in power consumption.

In case the parts being hardened are not of regular form such as the tappets shown, but are so irregular that uniform distribution of heating is not readily accomplished, these parts are rotated as they pass the inductor to distribute heating in the parts it is desired to harden. This is accomplished by the mechanism shown in Fig. 6. In this the receptacles in the conveyor disc 60 for the parts being hardened comprise radially arranged rotatable sockets 61 having a bevel pinion 62 attached to each. Each of these bevel pinions engage a stationary bevel gear 62' so that when conveyor disc 60 rotates carrying the receptacles and their attached pinions, the pinions are positively rotated due to their engagement with the stationary gear. The tappet or other part carried by the socket thus rotating in the conveyor disc is made to occupy a different position relative to the inductor at each of the successive heating stations. It will be apparent from the above description of the driving mechanism that these stations may be close together and as numerous as desired with the heating period at each station reduced to a predetermined length of time. By substituting a continuous drive for the intermittent drive shown in Fig. 5 the heating and quenching can be made continuous and progressive. In such drive a flexible shield through which the parts pass in moving from the heating to the quenching position is often required.

Numerous modifications of the present mechanism will suggest themselves to those skilled in the art, such, for instance, as a conveyor comprising a chain or belt having receptacles for the articles attached to or integral as with the links of the chain. The chain or belt being guided over a platform or table, moves the articles at a predetermined distance or distances from the inductor or inductors which extend along the table and at such predetermined distance therefrom as to provide the desired magnetic coupling with the articles carried by the conveyor. A rack extending along such conveyor to engage pinions attached to the receptacles for the articles rotates the articles as they advance and the advancing is readily accomplished by either continuous or intermittent motion such as that shown on the present drawings or by a racket or other mechanism.

Since oil or other combustible material frequently adheres to the parts to be hardened, a large amount of smoke or obnoxious gases are thrown off during heating. To eliminate the resulting annoying and unhealthy conditions, the fan 18 which draws air past the cooling fins of the transformer, is connected to ducts such as 70, which pick up the smoke and gases given off by the parts being heated and exhausts these gases with the transformer cooling air into a stack from which it escapes into outside air.

It is to be noted that one or more forms of our device is adaptable to not only harden or otherwise heat treat a metallic member, but that fusing together two or more parts such as by welding or brazing can be accomplished either by itself or in combination with heat treatment. For instance, the semi-spherical end of the tappet is inserted in the cylindrical portion and as this semi-spherical end and the end of the cylinder pass through the high frequency field, these parts are heated to fusing temperature and are thus joined. The quenching fluid being directed against the face of the semi-spherical part cools this face only fast enough to harden it. The remaining parts such as those at the region of fusing cool too slowly to become hardened.

In its various embodiments this invention employs inductors of numerous forms. These inductors in some cases are single members having a return circuit outside of the heating field. In other cases the inductors vary in cross section so that the heating effect changes as the article advances along them. In other cases the distance of the inductor from the article varies which is accomplished by preferably changing the form of the inductor, but also is accomplished by changing the course of travel of the article by modifications in the movement of the conveyor.

Other modes of applying the principle of our invention may be employed instead of the one explained, change being made as regards the means herein disclosed, provided those stated by any of the following claims or their equivalents be employed.

We, therefore, particularly point out and distinctly claim as our invention:

1. In apparatus for heat treating a surface zone of an article, a conductor, means for supplying periodically varying current to said conductor, a conveyor adapted to carry said article, guiding means for the article, the guiding means serving as an insulator for the conductor, and means for moving said conveyor to carry the surface zone along said conductor and in closely spaced relationship therewith to induce heating current in the surface zone.

2. In apparatus for heat treating a surface zone of an article, a longitudinally extending conductor, means for supplying periodically varying current to said conductor, a conveyor having means to receive said article, means extending along the conductor for guiding the article, the guiding means being an insulator serving to insulate the conductor from an adjacent conductor, and means for moving said conveyor to carry the surface zone along said conductor and in closely spaced relation therewith to progressively increase the temperature of the surface zone by current induced therein.

3. In apparatus for heat treating a surface zone of an article, longitudinally extending conductors, means for supplying periodically varying current to the conductors, a conveyor for the said article, guiding means for the article, the guiding means serving as a spacer for the conductors, means for intermittently moving the conveyor to carry the article past the conductors and in closely spaced relation thereto to induce heating current in the aforesaid surface zone to progressively raise the temperature of said surface zone.

4. In apparatus for heat treating a surface zone of an article, a longitudinally extending conductor, means for supplying periodically varying current to said conductor, conveyor means for carrying said article along said conductor and in closely spaced relation thereto to induce heating current in the said surface zone, guiding means for the article, the guiding means lying adjacent to the conveyor, and quenching means, the said conveyor means being adapted to carry the said article into engagement with the quenching means to quench the said surface zone.

5. In apparatus for heat treating a surface zone of an article, a longitudinally extending conductor, means for supplying periodically varying current to the conductor, a conveyor for said article, means for intermittently moving the conveyor to advance the article by steps along the conductor and in closely spaced relation thereto to progressively increase temperature of the surface zone by current induced therein, and quenching means, the quenching means lying adjacent to the conductor and at the exit end of the conductor, said quenching means comprising a stream of quenching fluid, the intermittent movement of the aforesaid conveyor being adapted to suddenly move the article into said stream.

6. In apparatus for heat treating a surface zone of an article, a conductor, a transformer for supplying periodically varying current to the conductor, said transformer having a core comprising fluid cooled fins, conveyor means for moving the article along the conductor and in closely spaced relationship therewith to induce heating current in the surface zone, and means for circulating cooling fluid over said fins and for evacuating heat-produced fluid from space adjacent to said article.

7. In apparatus for heat treating a surface zone of an article, a U shaped conductor having substantially parallel longitudinally extending members, a source supplying periodically varying current being connected across terminals of the U to produce a flux field between said members for heating the article, and conveyor means for carrying the article angularly into a plane of the members of the U and generally longitudinally of the members and between the members a distance less than the full length of the members and then to carry the article angularly out of the plane of the said members.

8. In apparatus for heat treating a surface zone of an article, a longitudinal conductor, a transformer for supplying periodically varying current to the conductor, the transformer having a laminated core, selected laminations of the said core being extended to serve as cooling fins for the transformer, conveyor means for carrying the aforesaid article along the conductor and in closely spaced relation thereto to heat the aforesaid surface zone, and fluid circulating means to cool the extending laminations of the transformer and to evacuate gases surrounding a part of the aforesaid conductor.

9. In apparatus for heat treating a surface zone of an article, two substantially parallel spaced conductors, said conductors being connected in series, means supplying periodically varying current to said conductors, a conveyor for carrying said article in spaced relation with the conductor, said conveyor comprising a receptacle to receive a part of said article and guiding means to hold the article in said receptacle and in a prescribed relation with the conductors while the conveyor moves the article past the conductor.

10. In apparatus for heat treating a surface zone of an article, two substantially parallel spaced conductors, said conductors being connected in series, means supplying periodically varying current to said conductors, a conveyor member for carrying said article in spaced relation with the conductors, guiding means for holding the article in prescribed relation with the conductors while the conveyor moves the article past the conductors and quenching means, said quenching means comprising a guide for the said article, the quenching means lying adjacent to the conductor and along the line of travel of the article and being disposed to engage the article when the article leaves the conductor.

11. In apparatus for heat treating an article, a rotary conveyor, the conveyor being adapted to carry the article along a prescribed path, a receptacle in an outer part of the conveyor to receive the article, means lying adjacent to the conveyor to retain the article in the receptacle, and an inductor lying adjacent to the path of the article to induce heating current in the article while the article passes the said inductor, the retaining means for the article being formed to permit the article to be removed from the receptacle at a predetermined part of the path.

12. The method of heat treating a surface zone of a metallic article comprising moving the article along a curved path to bring the article into progressively closer proximity with an inductor to progressively increase heating in the article, continuing the movement to carry the article along the inductor and in generally constant proximity with the inductor during a heating interval, supplying periodically varying current to the inductor and continuing the movement of the article in the same general direction relative to the inductor along a curved path to carry the article out of heating proximity with the inductor.

13. The method of heat treating a surface zone of a longitudinally extending metallic article, comprising moving the article laterally by means of a conveyor element along a longitudinally extending heater to bring parts of the surface zone progressively into heating relation with successive parts of the heater while supplying energy to the heater to produce a heating region extending longitudinally of the heater, the movement of the article being generally longitudinally of the heater but at a sufficient angle with the heater to bring the surface zone of the article progressively more deeply into the heating region to extend the surface zone longitudinally a predetermined distance along a part of the article, moving the article relative to the conveyor element to distribute heating in the zone, and continuing the lateral movement of the article to carry the said zone thru and out of the heating region while limiting the heating to said zone.

14. In a method of heat treating a zone of a metallic article, the steps comprising moving the article along a curve to bring the zone progressively into a flux field of an inductor, continuing to move the article along the curve and along and generally parallel with the inductor to progressively carry the zone through the flux field and to a predetermined depth in the flux field, continuing the movement of the article to carry the zone through and out of the flux field, and supplying inducing current to the inductor to produce the flux field.

15. In apparatus for heat treating metallic articles, an inductor, two conveyors, each conveyor having means to carry an article to be heated, means for driving the conveyors to move the articles simultaneously toward the inductor and toward each other to cause parts of the articles simultaneously to come into heating relation with opposite sides of the inductor, the conveyors being disposed to carry the articles a substantial distance along the inductor and in heating proximity with the inductor during a heating interval, and means for supplying inducing current to the inductor.

16. In a method of heating a surface zone, the zone comprising a selected portion of a longitudinal metallic article, the steps comprising moving the article laterally along a longitudinally extending element of a conductor, the direction of a part of the movement being along a curve and at an angle with a longitudinal element of the conductor to bring a part of the surface zone progressively into more closely spaced relation with successive elements of the conductor while the article is being moved laterally along the conductor and while supplying periodically varying current to the conductor to produce an alternating flux field in a space being traversed by said surface zone, the angle of movement being such as to limit the heating to a selected part of the article, and progressively changing the direction of movement to carry the article out of proximity with the conductor.

17. In apparatus for heat treating a surface zone of an article, a conductor in the form of a longitudinally extending loop, the loop comprising two substantially parallel members, means for supplying periodically varying current to the conductor, means for advancing the article longitudinally along the parallel members of said loop and with the surface zone extending into heating range of the loop to induce heating current in the said zone, and means for projecting quenching fluid onto the surface zone substantially as soon as said article passes beyond an end of one member of the loop.

FRANCIS S. DENNEEN.
WILLIAM C. DUNN.